(12) United States Patent
Kouba et al.

(10) Patent No.: US 6,616,453 B2
(45) Date of Patent: Sep. 9, 2003

(54) REMOTE CERTIFICATION OF WORKERS FOR MULTIPLE WORKSITES

(75) Inventors: Don M. Kouba, Chicago, IL (US); Brian O'Reilly, Chicago, IL (US)

(73) Assignee: Kouba-O'Reilly Consulting Group, Chicago, IL (US)

( * ) Notice: Subject to any disclaimer, the term of this patent is extended or adjusted under 35 U.S.C. 154(b) by 0 days.

(21) Appl. No.: 09/942,197

(22) Filed: Aug. 29, 2001

(65) Prior Publication Data

US 2002/0031752 A1 Mar. 14, 2002

Related U.S. Application Data

(63) Continuation-in-part of application No. 09/441,599, filed on Nov. 17, 1999, now Pat. No. 6,325,631.

(51) Int. Cl.$^7$ ............................................... G09B 19/00
(52) U.S. Cl. ........................ 434/219; 434/350; 434/362
(58) Field of Search ................................. 434/118, 218, 434/219, 236–238, 258, 322, 323, 335, 350, 362, 365; 705/74, 77; 706/915, 927, 961; 707/104, 508; 708/131, 160; 713/170

(56) References Cited

U.S. PATENT DOCUMENTS

| | | |
|---|---|---|
| 5,306,154 A | 4/1994 | Ujita et al. |
| 5,326,270 A | 7/1994 | Ostby et al. |
| 5,372,507 A | 12/1994 | Goleh |
| 5,862,223 A | 1/1999 | Walker et al. |
| 5,879,165 A | 3/1999 | Brunkow et al. |
| 5,957,699 A | 9/1999 | Peterson et al. |
| 6,091,930 A | 7/2000 | Mortimer et al. |
| 6,157,808 A | 12/2000 | Hollingsworth |
| 6,213,780 B1 | 4/2001 | Ho et al. |

*Primary Examiner*—Joe H. Cheng
(74) *Attorney, Agent, or Firm*—Foley & Lardner (57) ABSTRACT

A testing system, particularly directed at contract workers, permits computer-aided instruction and testing at each of a plurality of testing sites. Different tests are created and administered for each of a plurality of work sites, which can be selected by the prospective contract worker. Whether the worker passed a particular site-specific test is stored in a database, which in turn is accessible by the work site management. The system has particular application to safety instruction and testing as mandated by the Occupational Safety and Health Administration.

1 Claim, 8 Drawing Sheets

WORKER

NAME
ADDRESS
WORKER NUMBER
WORK SITE 1 [PASS, ∅; DATE]
 •
 •
 •
WORK SITE M [PASS, ∅; DATE]
PHOTO ID FILE

FIG. 6

WORKSITE

WORKSITE ID
NUMBER OF QUESTIONS TO BE ASKED
QUESTION ONE [TEXT]

⋮

QUESTION N [TEXT]
TOTAL NUMBER OF QUESTIONS = N
ID OF INSTRUCTION FILE
PASS CRITERION P = f [N]
INSTRUCTION FREQUENCY
WORKSITE MANAGER ID
WORKSITE MANAGER PASSWORD

FIG. 7

TEST ADMINISTRATOR

TEST SITE NAME
TEST SITE ADDRESS
ADMINISTRATOR ID
ADMINISTRATOR PASSWORD

FIG. 8

REMOTE CERTIFICATION OF WORKERS FOR MULTIPLE WORKSITES

This is a continuation-in-part of U.S. patent application Ser. No. 09/441,599, filed on Nov. 17, 1999, now U.S. Pat. No. 6,325,631 B1.

TECHNICAL FIELD

This invention relates in general to automated instruction and testing methods, and more particularly to a method for certifying a worker, at any of a plurality of test sites, to work at one or more of a plurality of work sites.

BACKGROUND OF THE INVENTION

There has been an increased focus on training workers to do their jobs effectively and safely preliminary to doing the work for which they were hired. This kind of vocational education and certification is now required in many instances by the Occupational Health and Safety Administration (OSHA) to ensure safe work practices. There are basic safety practices which will be pertinent for a large variety of workplaces, particularly those of a single industry or a related group of industries, and then there are practices which will be peculiar to a particular plant or worksite and which relate to the exact work conditions, apparatus and processes obtaining at that site. The general, basic safety practices are conventionally given in a traditional classroom setting and are taught by human instructors. Specific, customized safety practices have conventionally been the job of safety personnel assigned to a particular plant or worksite.

Another recent trend is an increasing dependency by the industry on independent contractors rather than employees. These contractors are retained for relatively short periods by any one plant or workplace, and often work at several sites owned by different proprietors within a single year. Because different plants don't typically share OSHA training programs or records, at the start of each work period at a work site, the contractor often has to be recertified. This has resulted in repetitious, unnecessary and expensive recertification procedures undertaken by each different plant proprietor of a single contractor during a year. Also, the plant proprietors are willing to let third party entities provide safety instructions to contractors and maintain the associated records.

Recently, in an attempt to address this problem, in the State of Texas a local group of manufacturing plants has federated into a Safety Council. This Safety Council is a nonprofit organization that provides a central facility for the instruction of contract workers who tend to circulate among the plants. A basic, instructor led safety course is given, and then the workers are put through a computer-generated, plant specific course for the facility at which they would like to work. Both courses conclude with a test which, if the worker passes, will certify the worker on safety requirements for a particular plant for a given, usually long period of time, such as a year or more. Each worker's test results (typically simplified to whether the worker passed or has not yet passed a safety test for a particular facility) is stored in a database at the Safety Council. These test outcomes are accessible by each plant proprietor/member of the Safety Council, for the purpose of determining whether that contract worker is qualified to work at the plant in question. This arrangement obviates repetitive and unnecessary instruction and testing while still maintaining acceptable levels of worker safety knowledge.

While this Safety Council has been effective in providing a pooled safety program for a local group of plants, improvements could still be made with respect to geographic availability.

SUMMARY OF INVENTION

According to the present invention, a means of delivering the benefits of a safety council, including delivering site-specific training, and associated tests for each of a plurality of plants or work sites is provided, and a relational database is maintained that provides, for each of a plurality of plants or work sites, a set of specific questions relating to the safety of the plant. The site-specific training and tests can be delivered either by CD, LAN or WAN, such as the Internet. Each work site is owned or managed by a proprietor (typically a company or division) which determines minimum acceptable passing criteria for the test for that facility and which communicates these passing criteria to the database in one embodiment of the invention. It is preferred that the database be located at a central database facility.

A single or plurality of testing sites, such as community colleges, are each linked to the database by means such as a wide area network. In a preferred embodiment, this network is the Internet. In one embodiment of the invention, at each testing site there is a means for delivering both the basic OSHA instruction and plant site-specific training. The testing sites have a secure testing terminal at which prospective workers may receive instruction and, at the conclusion thereof, take a test relating to the basic OSHA course or a specific worksite. A test administrator associated with the test site verifies the identity of the prospective worker wishing to receive the instruction and take the test, and further ensures that the prospective worker is correctly identified. Software sets up the instruction course in advance for electronic instruction on the terminal and at the conclusion thereof administers the test. Preferably, the database generates in real time a test from a random selection of prestored questions. The database prompts the worker for answers to each of the test questions, compares them to the model answers, and determines if the responses are sufficiently matched to the model answers that, according to the standards predetermined by the work site management, the worker has passed the test. If this is the case, a "pass" indication is recorded in the database for that work site and that worker. This "pass" indication will typically be valid for a relatively long predetermined period of time, such as a year, before further instruction is required. The test results may be added manually, or automatically uploaded to the database.

In this way, remoteness of the prospective worker from the work site need not be an insurmountable problem. The worker can receive instruction in respect of a work site on the other side of the country or world near his or her present residence, receive certification and be ready to work upon arrival. This is also an aid to the plant or work site operator, as the available pool of certified labor is greatly expanded, reducing labor shortages and costs.

Preferably, the site-specific test and course is offered together with a separate, basic course which applies to all or many of the worksites. This basic course is preferably instructor-led and may be taken before the site-specific course. It is further preferred that the basic course test results be transmitted to and stored at the central relational database.

BRIEF DESCRIPTION OF THE DRAWINGS

Further aspects of the invention may be discerned in the following detailed description when taken in conjunction with the drawings, in which like characters denote like parts and in which.

DETAILED DESCRIPTION

Figure 1:
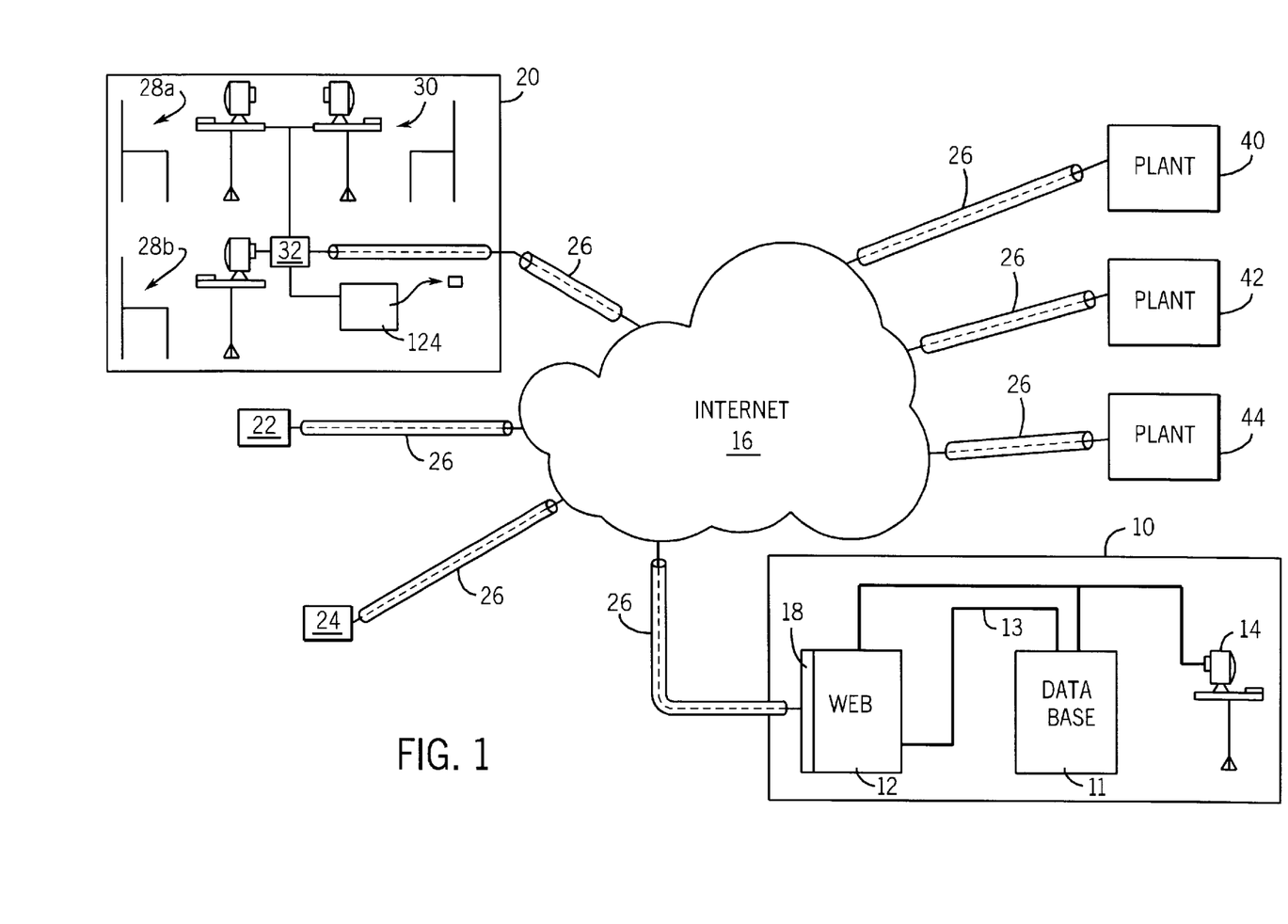
FIG. 1 is a high level schematic system block diagram of an instruction and testing network according to the invention.

FIG. 1 is a high-level schematic diagram of an instruction and testing system according to the invention. An education and testing service provider has at least one site or relational database 10. In one embodiment of the invention, the relational database 10 includes a database server 11 and a web server 12. The database server 11 and the web server 12 are connected together as by a local network connection 13.

The database server 11 has sufficient random access memory, such as a two megabyte memory, to operate a bootable operating system, the relational database 10, and the related executable computer programs. The database server 11 also possesses one or more processors which are powerful enough to assemble tests, administer courses and tests over the network and store the results at the relational database 10. In one embodiment of the invention, the database server 11 and the web server 12 include an administrator terminal 14 to permit access to the executable program(s).

The web server 12 may also include a network interface to permit the web server 12 to communicate to a wide-area network 16, and a firewall application 18 to prohibit unauthorized access. The wide-area network 16, in one embodiment of the invention, is the Internet.

In one embodiment of the invention, the relational database 10 may have the capability to assemble tests, administer courses and tests over the network, and store the results at the site.

Each of a plurality of test sites 20, 22 and 24 are connected to the web server 12 over the wide-area network (the Internet) 16. Individual network connection can be a 28.8 k or 56 k baud conventional telephone line, an ISDN line, or a more expensive and faster connection method such as DSL, a T1 line or a wireless connection. The Internet 16 includes the internet service provider (ISP) of each of the test sites 20, 22 and 24, to the extent that these sites are not self-hosting. While three such sites 20, 22 and 24 are shown, there may be dozens or even hundreds of such sites. Most or all of the test sites may be instantiated by facilities at community colleges, which often specialize in vocational education.

In one embodiment of the invention, communication over the wide-area network 16 is performed by some secure method such as a point to point tunneling protocol (PPTP), which creates what appears to be a virtual private network. This communications protocol is represented by the pipes 26 surrounding the internet connections, to show the degree of privacy.

In FIG. 1, exemplary test site 20 has been illustrated in detail. Sites 22 and 24 will, in general, be similar. Each testing site 20, 22 and 24 has the means to deliver instruction concerning basic OSHA safety to personnel. This may include classrooms, materials, and an instructor. In addition, for the delivery of plant site-specific instruction, each site 20, 22 and 24 has at least one, and typically more than one, terminal 28 (terminals 28a and 28b are shown by way of example) at which a worker can receive course instruction over the wide-area network 16 and a test at the end of such instruction. The instruction can occur via CD, LAN, or WAN depending upon the particular system specifications. Each site 20, 22 and 24 also has means to verify the identity of the worker, so as to prevent "ringers" from taking tests for others. Human-specific and hard-to-defeat automatic identification measures include fingerprint scanning and retinal scanning. At the time of writing, however, these automated identification techniques tend to be expensive, and therefore a more preferable method is to staff the test site with a human administrator who will ask for, e.g., photo identification to verify that the worker is who he says he is. This same or a different administrator will also ensure that the worker is correctly identified to the server, as by entering identifying data on an administrator terminal 30, so that the test results will be correctly attributed to that worker and no one else.

Each terminal at the test site has a display and a graphical user interface, such as a mouse, or some other method of recording the worker's responses. In one embodiment of the invention, the worker terminals 28a and 28b and the administrator terminal 30 are connected to a local area network server 32, which in turn manages the connection to the Internet 16. In alternate embodiments, only one worker test station 28 may be present, and no LAN server 32 or administrator terminal 30; in these simpler embodiments, the course and tests may be delivered via CD or even the terminal's hard drive. The administrator would set up the course and test on the worker terminal 28 before permitting the worker to continue.

Each of the plants or work sites 40, 42 and 44 (only three are shown, although there will be dozens and perhaps hundreds) each have peculiar working environments and may employ processes and equipment not found at the other plants. That is why a site-specific course and test are necessary. The work sites will typically be permanent manufacturing facilities or subsections of the same, but may also be less permanent sites such as construction sites. The management of each plant 40, 42 and 44 furnishes a site-specific course to the relational database 10, a set of questions to be asked on the material, and a criterion, such as a number of the questions answered correctly, to determine whether the worker has passed the test to the plant management's satisfaction. The pass/fail criterion may be more complex than a simple number of questions answered correctly. For example, the management of one plant 40 may desire that each of a predetermined subset of questions be always asked, and that each of them be answered correctly before the worker is deemed to pass the test.

Because all of the testing sites and work sites are connected through a wide area network 16 such as the Internet, geographical proximity of the worker to the plant or work site is no longer necessary. The worker only need be close to one of the test sites, which as mentioned above ideally will be sited at the numerous community colleges across the country.

While the invention is particularly useful for the administration of safety-related courses and tests, it is not limited to this. The present invention has application to any situation in which a worker or other student is required to master material pertinent to a remote site. This Internet-based electronic coursework may be used, for example, to train a new employee or contractor on office procedures before the worker starts work at that site. This method reduces downtime of the worker associated with getting acclimated to the new work environment, and this preparation can be more at the convenience of the new worker.

FIGS. 2–5 are flow diagrams of the illustrated embodiment of the invention.

Figure 2:
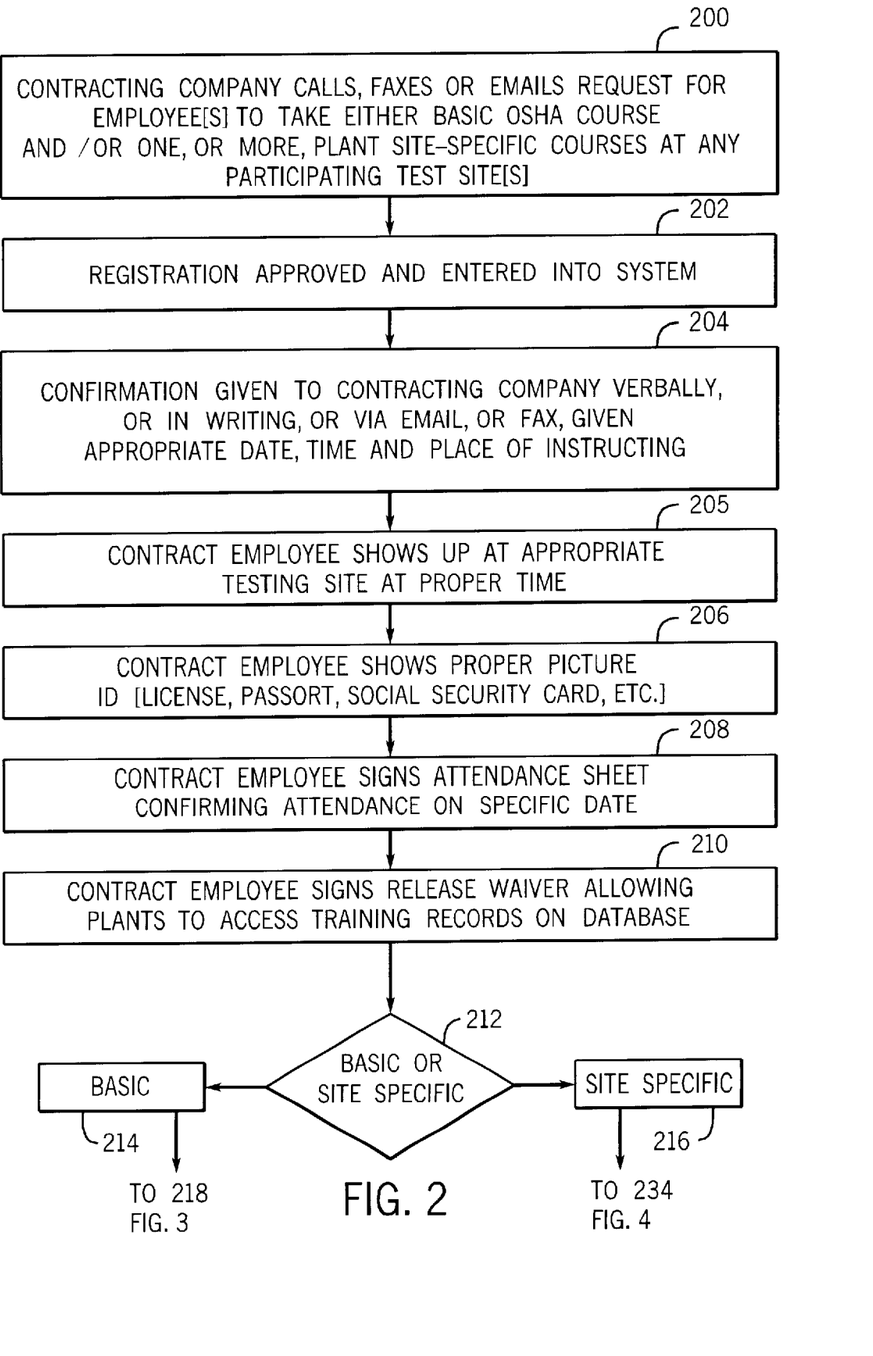
FIGS. 2–5 are high-level flow charts showing the procedure by which basic and site-specific instruction and testing are given according to the invention.

FIG. 2 is a flow chart segment setting up the instruction and test and identifying the worker, both to the test site and to the database. At step 200, the contracting company (which may be the proprietor of one of the work sites) calls, faxes or emails a request for one or more of its contracting workers or employees to take either a basic course relevant to many worksites, and/or one or more site-specific courses. The communication is made to one or more participating test sites. At step 202 the central relational database approves registration and enters the fact that the worker will be taking this instruction into the system. In one embodiment of the invention, the name may also be added to the central database if the course work is to be delivered via the Internet. Alternatively, the name and any associated records may be manually added to the database at a later time.

At step 204, any of various methods can be used to confirm back to the company that the course instruction will be given, giving date, time and the place of instruction. At step 205, the contractor worker or employee will show up at the appropriate testing facility at the proper time.

The contract worker next identifies him or her self to a test site administrator in step 206, producing a photo ID such as a license, passport, social security card or the like. At step 208, it is preferred that the worker sign an attendance sheet confirming attendance on the specific date. It is also preferred, at step 210, that the contract employee sign a release waiver allowing the plants to access training records on the database. This concludes the introductory segment of the procedure. The procedure then branches to either the basic instruction and test at step 214, or a site-specific test at step 216.

Figure 3:
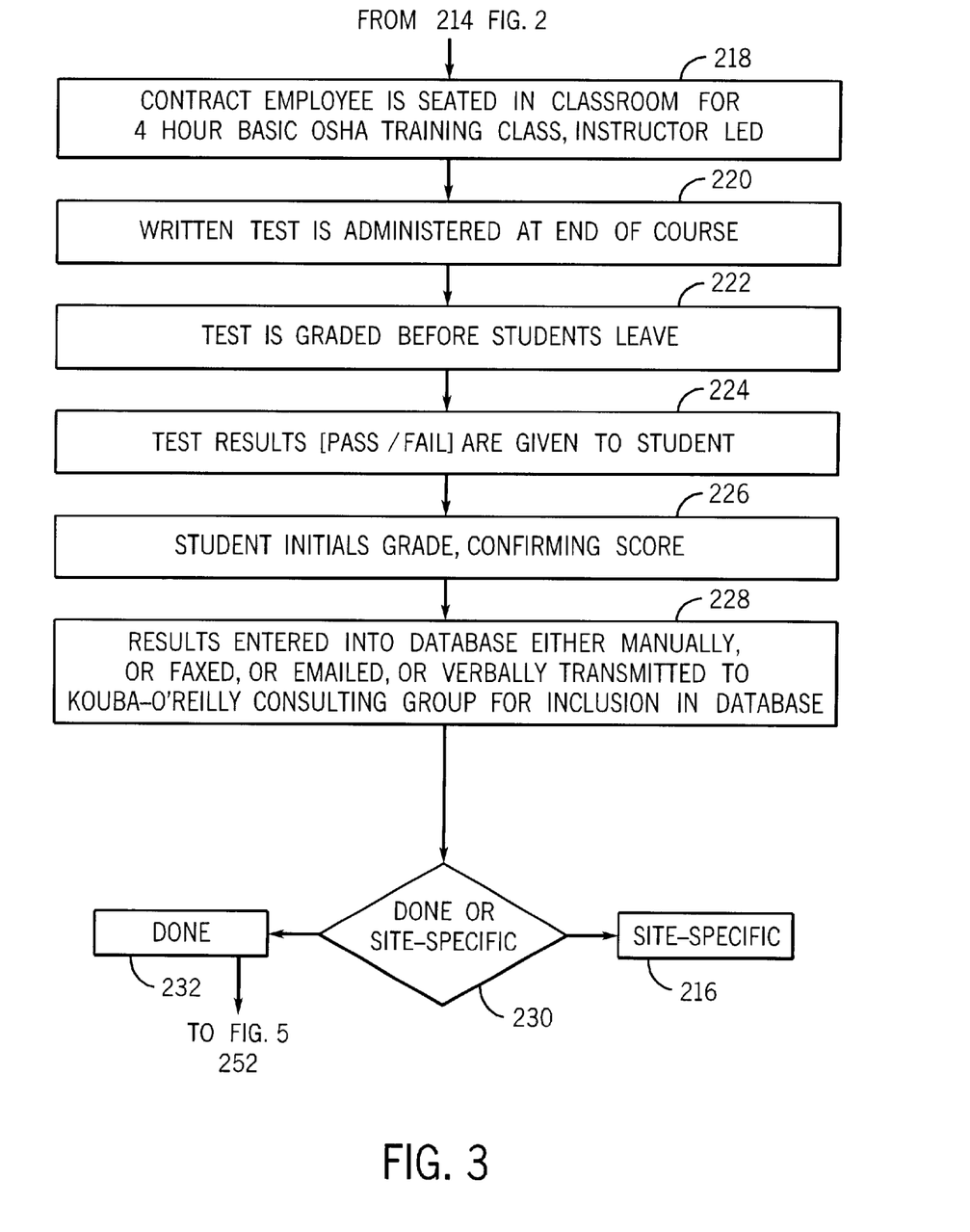

FIG. 3 is a flow chart concerning the basic test 214. At step 218, the worker is seated in a classroom for, e.g., a 4-hour basic OSHA training class, which is instructor led in one embodiment of the invention. At step 220, a written test is administered at the end of that course. At step 222, the test is graded before the students leave and, at step 224, the test results are given to each student, indicating whether they have passed or have failed the course. At step 226, the student is asked to initial the grade to confirm the score.

At step 228, these results are entered into the database either manually, electronically or otherwise, to preferably make up a portion of the relational database that later may be accessed by plants and/or the contracting company or companies. The entirety of the instruction may then end at step 232, or instead, the worker may proceed to a site-specific segment of the instruction at step 216.

Figure 4:
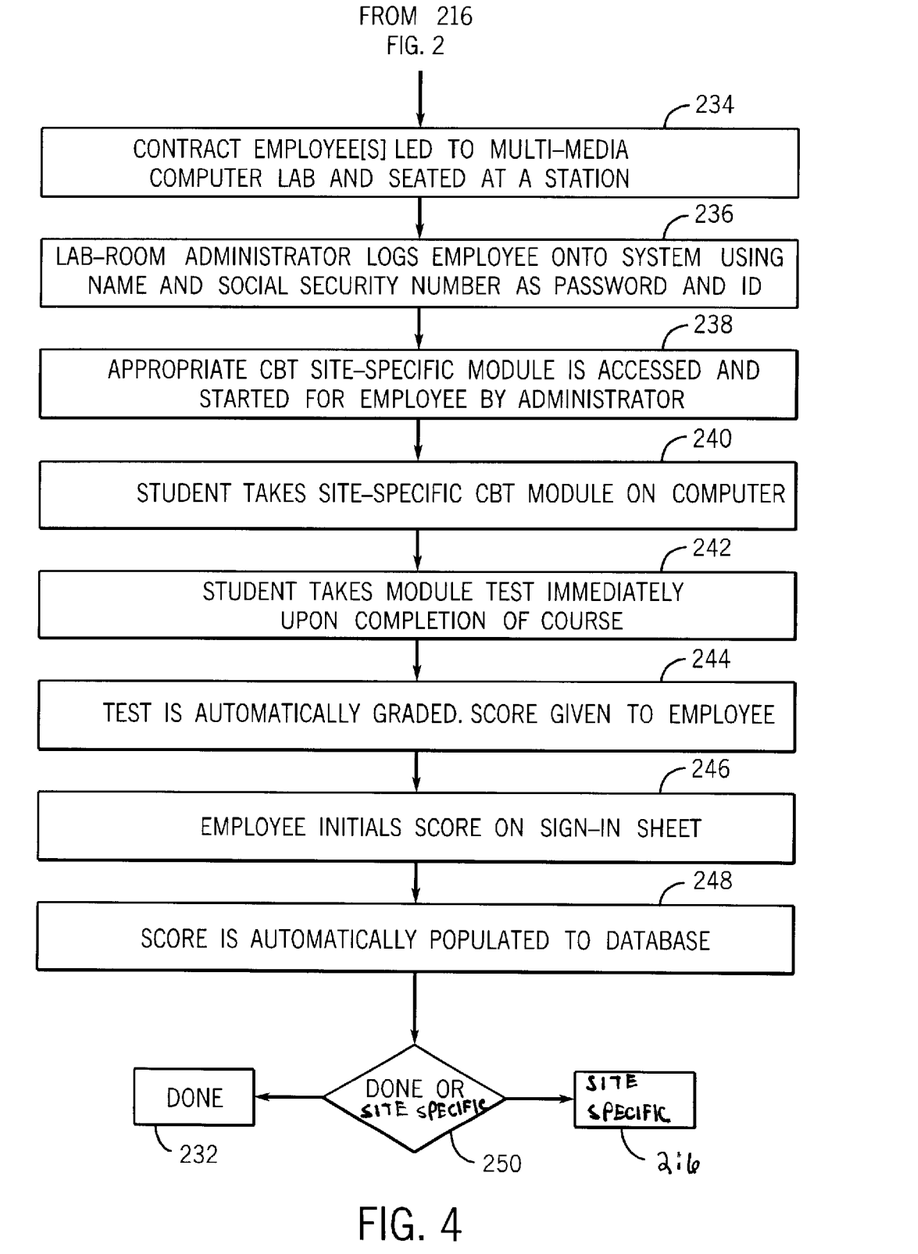

FIG. 4 is a high level flow chart concerning the site-specific procedure according to the invention. At step 234, the contract employee or worker is led to a multi-media computer lab and is seated at a station. At step 236, the lab room administrator logs the employee onto the system using the name and social security number as the password and ID.

At step 238, an appropriate computer based site-specific module is accessed from the relational database (or, alternatively, from a local memory) and is started for the worker by the administrator. Then, at step 240, the student takes the site-specific computer based training module on the worker computer station.

At some time during, before or immediately following this course, the relational database will retrieve a set of questions based on the selection of the worksite which is made by the administrator. The relational database will randomly select a series of questions from a site-specific table of such questions to assemble a test. The relational database will return to the test site those questions, together with their model answers and a site-specific pass/fail criterion.

At step 242, the student takes this test immediately upon completion of the course. At step 244, the computer compares the worker's responses to the model answers, the pass/fail criterion is applied, and the test is automatically graded. The score is given to the worker. At step 246, the worker is asked to initial the score on the sign-in sheet. At step 248, this score is populated back to the relational database. This step can be performed either electronically, manually or otherwise. At step 250, the worker may return to do another site specific course or instruction may be completed.

Figure 5:
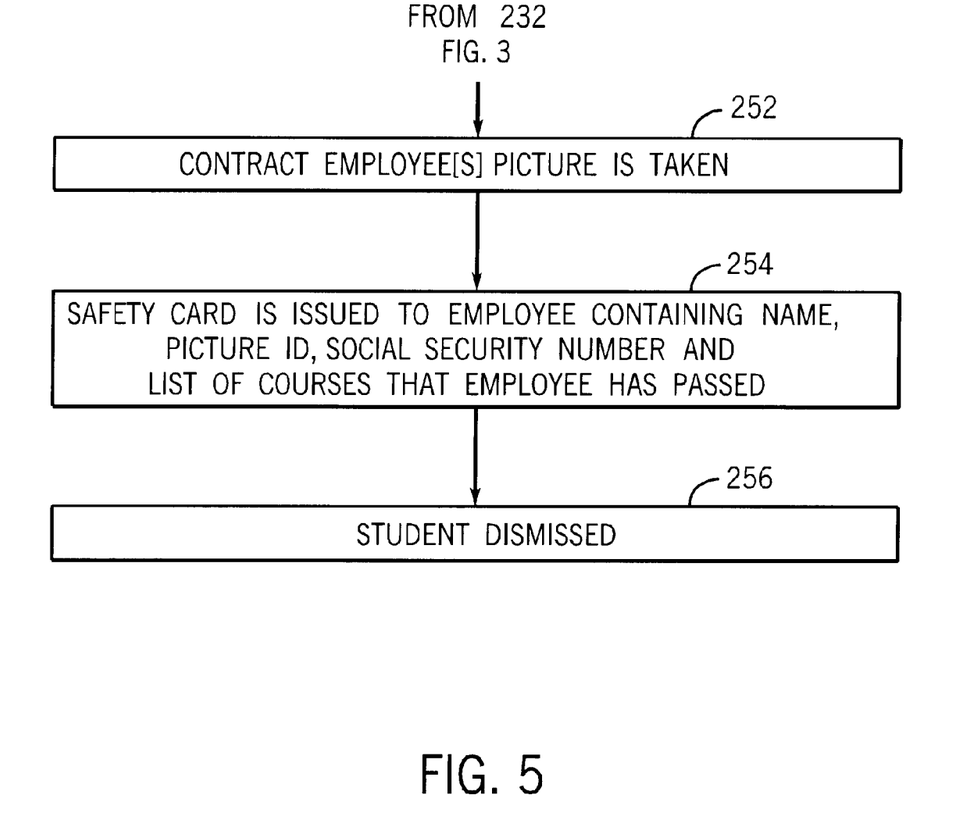

FIG. 5 is a terminating portion of the procedure. In one embodiment, at step 252, the contract employee's picture is taken; this picture may be populated back to the relational database. At step 254, a course card (such as a safety card) is issued to the worker containing the name, picture ID, social security number, list of courses that the worker has passed, and possibly other information. The entire procedure terminates at step 256.

The system randomly selects a number of questions (and their respective model answers) from a larger number of questions (and their respective model answers) from a question pool in order to assemble the test. This can be done in any of several ways. For example, the management of the selected work site may have furnished to the system the total number of questions to be asked in any test. A number or other identifier could key the questions stored in the question pool. The system could, lottery-like, generate a series of random numbers within the range of the total number of questions formulated for the selected work site. These numbers would identify the questions to be asked on that particular test.

Preliminary to administering the course, the system retrieves an, e.g., multimedia instruction file from the individual terminal or an associated space and gives a course on the material. Preferably, the course is interactive and prompts the worker to answer questions along the way.

Alternatively, the system may download both the course material and the test to the terminal 28 in one step, with test results then transmitted back to the relational database 10 at the conclusion of the process. In one embodiment, the server 32 will have programming sufficient to administer the coursework and test locally, and to automatically report back the results over the Internet 16 to the database server 11 at its conclusion. The degree to which the executable portions of the system (such as courses and their associated tests) are centralized or distributed may be changed according to the predilection of the system designer. For example, in one alternative embodiment the multimedia course file is transmitted in advance to each test site, and the file for the selected work site is accessed at the time that the course and test are taken. The results may also be reported manually into the database.

In the illustrated embodiment, the system will issue a card to the worker, using for example printing apparatus 124 (FIG. 1) that is preferably installed at each test site at the purpose. Alternatively, the card may be printed at the central relational database 10 and mailed to the worker. The system uses data which are the same as that present in a WORKER table of the database. Alternatively, some or all of these worker-identifying indicia may be retrieved from a test site local memory such as server 32.

Figure 6:
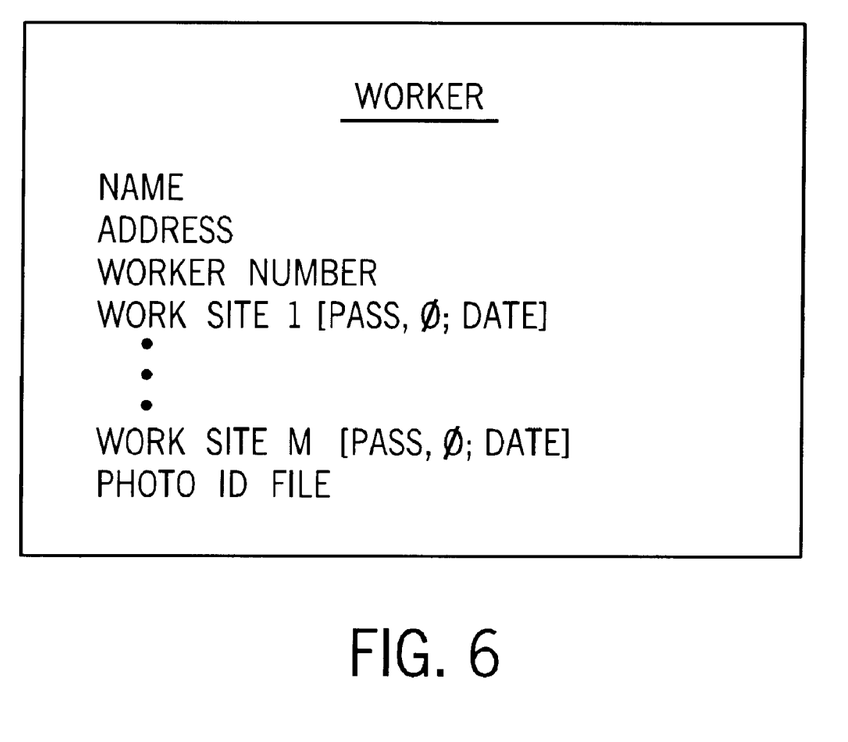
FIG. 6 is a diagram of a WORKER table in the relational database maintained according to the invention.
Figure 7:
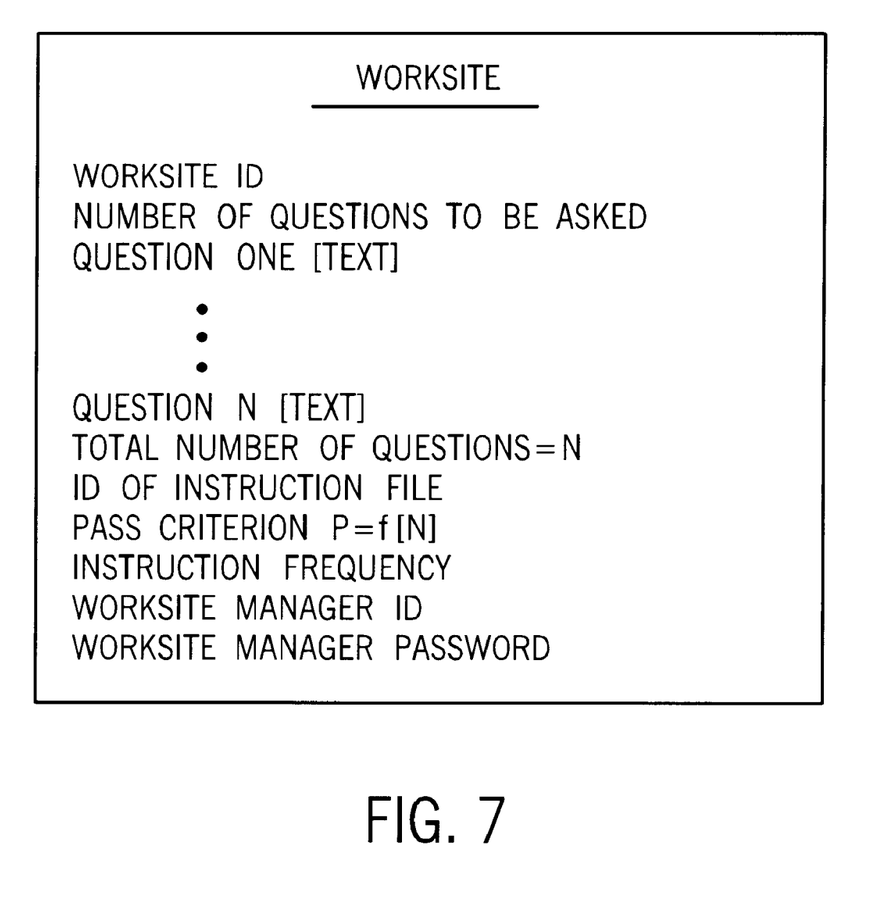
FIG. 7 is a diagram of a WORKSITE table in the relational database maintained according to the invention.
Figure 8:
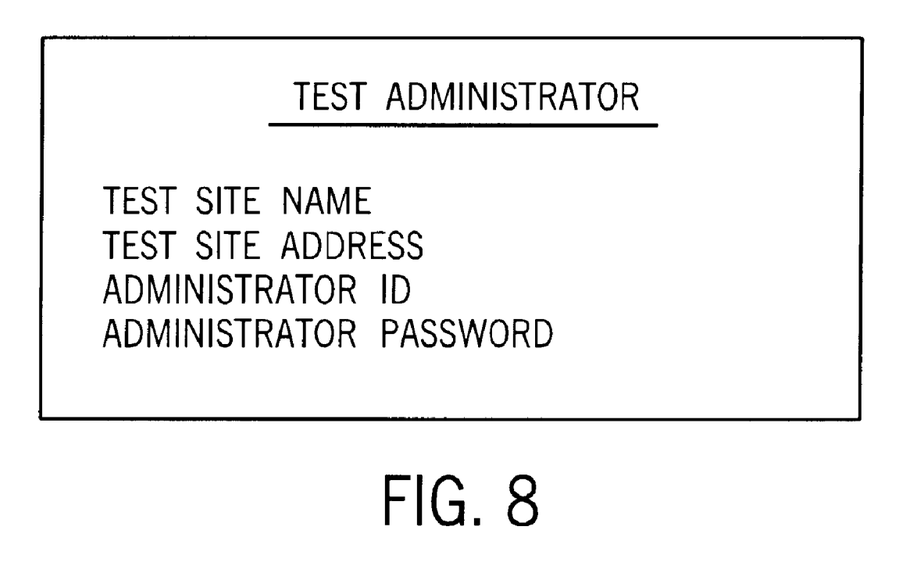
FIG. 8 is a diagram of a TEST ADMINISTRATOR table in the relational database maintained according to the invention.

FIGS. 6–8 are diagrams of three different tables which could be constructed in an exemplary database according to the invention. It is to be understood that numerous other tables, fields and interrelationships can be stored in the database than the ones illustrated and described, such as tables relating to the basic test information and drug testing information. The WORKER table preferably includes various fields uniquely identifying the worker, such as the worker's name, address and worker number (such as social security number). In one embodiment of the invention, the WORKER table also identifies an image file that stores a photograph of the worker, for use in generating an ID card. Finally, each member of the WORKER table will have an array of worksite data, where for each of M work sites there will be a field to record whether the worker has passed a specific test for that work site, and when.

FIG. 7 illustrates a representative WORKSITE table in the database. Each member of this table will have a worksite identifier that uniquely identifies the work site to the system. In some embodiments of the invention, this table could also store the number of questions to be asked (this could vary, and is supplied by work site management), the number of and text for each possible question relating to that worksite, the total number N of questions to be presented to the worker, an identifier for the multimedia course file to be downloaded to the test site, and the pass criterion established by work site management (which typically will be a function of the number of questions presented). In one embodiment of the invention, WORKSITE will also contain the frequency with which instruction should be given to each worker, which in turn will permit an expiration date on the worker's certification to be calculated. WORKSITE will also contain a manager ID and password to restrict access to the content of that WORKSITE member to personnel authorized by the management of that work site.

FIG. 8 is a diagram of an exemplary database table which identifies each test site and the administrator authorized to initiate testing at that test site. There may be more than one such administrator at each such site.

While certain embodiments have been described in the foregoing detailed description and illustrated in the appended drawings, the present invention is not limited thereto but only by the scope and spirit of the appended claims.

We claim:

1. A method for certifying that contract employees are qualified to work in a selected one of a plurality of work sites, comprising the steps of:

providing a relational database;

providing a plurality of instruction and test sites which are geographically separate from each other and from the work sites;

storing a plurality of training records associated with a particular employee into the relational database;

providing site-specific course material and associated tests for each member plant;

at one of the test sites, verifying the identity of a worker;

selecting a particular work site for which the worker is to be instructed with a site-specific course and for which a site-specific course is to be administered;

administering a computer-aided course to the worker keyed to the selected work site;

assembling a test from the site-specific questions concerning the selected work site;

at the conclusion of the computer-aided course, administering the assembled test;

using the model answer to the site-specific questions, grading the test;

comparing the test results to the pass/fail criterion for the selected site-specific test; and if the worker has passed the test, informing the database.

* * * * *